United States Patent [19]

Kakuta

[11] Patent Number: 4,656,545
[45] Date of Patent: Apr. 7, 1987

[54] MAGNETIC DISC MEMORY DEVICE
[75] Inventor: Kazuo Kakuta, Fujisawa, Japan
[73] Assignee: Nippon Seiko Kabushiki Kaisha, Tokyo, Japan
[21] Appl. No.: 633,795
[22] Filed: Jul. 24, 1984
[30] Foreign Application Priority Data Jul. 28, 1983 [JP] Japan .......................... 58-116451[U]

[51] Int. Cl.$^4$ ....................... G11B 17/00; G11B 5/012
[52] U.S. Cl. .......................................... 360/98; 360/97
[58] Field of Search ................ 384/100, 109, 113, 99, 384/107; 360/97–99, 107

[56] References Cited

U.S. PATENT DOCUMENTS

| | | | |
|---|---|---|---|
| 4,251,840 | 2/1981 | Maruyama | 360/107 |
| 4,301,487 | 11/1981 | Maruyama | 360/107 |
| 4,346,946 | 8/1982 | Maruyama | 308/9 |
| 4,363,047 | 12/1982 | Maruyama et al. | 360/107 |
| 4,381,528 | 4/1983 | Fujioka | 360/97 |
| 4,429,336 | 1/1984 | Berube et al. | 360/97 |
| 4,487,514 | 12/1984 | Mori | 384/113 |
| 4,547,081 | 10/1985 | Tanaka et al. | 384/107 |

FOREIGN PATENT DOCUMENTS

| | | | |
|---|---|---|---|
| 1532726 | 7/1968 | France . | |
| 2504620 | 10/1982 | France | 384/107 |
| 57-18812 | 1/1982 | Japan | 384/107 |
| 58-5518 | 1/1983 | Japan | 384/107 |
| 58-30965 | 2/1983 | Japan . | |
| 58-109715 | 6/1983 | Japan | 384/100 |
| 613388 | 6/1978 | U.S.S.R. | 360/97 |

*Primary Examiner*—John H. Wolff
*Assistant Examiner*—Matthew J. Bussan
*Attorney, Agent, or Firm*—Wyatt, Gerber, Shoup, Scobey and Badie

[57] ABSTRACT

A magnetic disc memory device comprises a rotatable member, a stationary member for supporting the rotatable member, dynamic pressure bearing provided between the stationary member and the rotatable member, a plurality of information recording magnetic discs mounted in axially spaced apart relationship on the outer peripheral portion of the rotatable member, an annular rotor provided on the outer peripheral portion of the rotatable member in axially spaced apart relationship with the magnetic discs, an annular stator secured to the stationary member and radially facing the annular rotor, the stator and the rotor together constituting an electric motor, and a case secured to the stationary member and surrounding the magnetic discs, the rotatable member, the rotor and the stator to protect them from extraneous influence.

10 Claims, 4 Drawing Figures

4,656,545

MAGNETIC DISC MEMORY DEVICE

BACKGROUND OF THE INVENTION

Field of the Invention

This invention relates to a magnetic disc memory device which can enhance the recording density of magnetic discs.

Description of the Prior Art

In conventional magnetic disc memory devices, magnetic discs are mounted on a shaft member which in turn is supported by a housing through a ball bearing. The ball bearing is lubricated by a lubricant such as oil or grease, and a rotor mounted on the shaft member is opposed to a stator mounted on the housing. A case disposed over the shaft member is mounted on the housing and this case hermetically seals a rotatable member through or not through a filter which communicates the gas in the case with the atmosphere.

Now, the balls, the inner race track, the outer race track and the retainer of a ball bearing are not complete in sphericalness and circularity, and the ball bearing has a portion which moves while being in solid contact with rotation. Accordingly, in the ball bearing, irregular vibration occurs during rotation and this irregular vibration causes vibration of the shaft member and magnetic discs. Magnetic signals are recorded in the form of concentric circles on the magnetic discs, but since the magnetic discs vibrate, the intervals between the adjacent circularly recorded portions cannot be narrowed to enhance the recording density. Also, when the ball bearing rotates, dust, foreign materials and evaporating substances exhale from the lubricant of the ball bearing and adhere to the surface of the magnetic discs and the surface of a magnetic head opposed to the magnetic discs. Therefore, reading and writing of the magnetic discs becomes impossible, and the magnetic head contacts the magnetic discs with the dust interposed therebetween and the magnetic head is damaged thereby. To prevent contamination of the magnetic discs and magnetic head, a contact type seal, a non-contact type seal or a magnetic fluid seal is sometimes used for a ball bearing. However, these seal structures are not perfect inasmuch as the rotation torque becomes great or sealing is insufficient, and moreover are costly. Furthermore, the ball bearing is great in friction moment and therefore, the power of the motor becomes great and it is difficult to make the motor compact. Also, both of the ball bearing and the motor having a rotor and a stator as the driving mechanism generate heat and transfer of the heat is non-uniform and thus, the temperatures of the various portions of the magnetic discs become non-uniform. The various portions of the magnetic discs are non-uniform in thermal expansion and therefore, positional deviation occurs to the various portions of the magnetic discs and the recording density of the magnetic discs cannot be enhanced.

SUMMARY OF THE INVENTION

It is an object of the present invention to provide a magnetic disc memory device which can enhance the recording density of magnetic discs.

The basic construction of the present invention consists in that magnetic discs are mounted on a rotatable member, a rotor mounted on the rotatable member is opposed to a stator mounted on a stationary member, a case disposed over the rotatable member hermetically seals the rotatable member through or not through a filter which communicates the gas in the case with the atmosphere, one of the rotatable member and the stationary member is a housing and the other is a shaft member, a cylindrical hole provided in the housing has a thrust bearing surface and a cylindrical radial bearing surface, the shaft member disposed in the cylindrical hole has a thrust receiving surface opposed to the thrust bearing surface and a radial receiving surface opposed to the radial bearing surface, at least one of the radial bearing surface and the radial receiving surface is provided with a dynamic pressure generating groove and the rotatable member is supported by the stationary member through a dynamic pressure type cylindrical groove bearing.

The invention will become more fully apparent from the following detailed description thereof taken in conjunction with the accompanying drawings.

DESCRIPTION OF THE PREFERRED EMBODIMENTS

Figure 1:
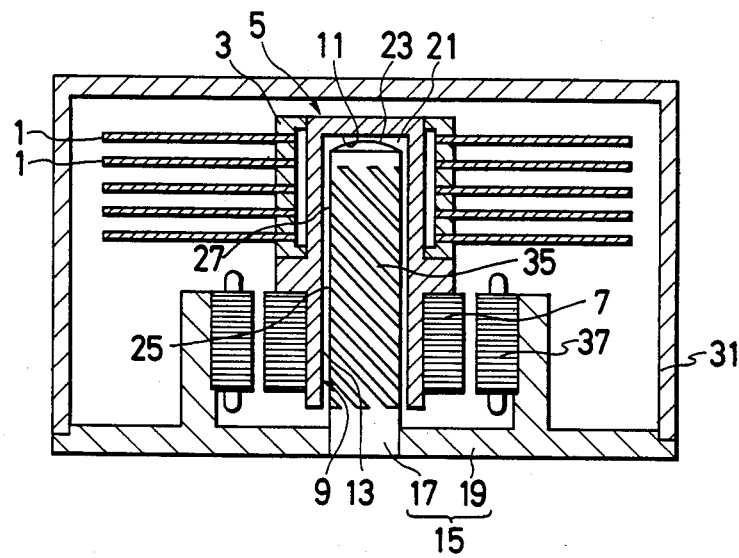
FIG. 1 is a cross-sectional view of a magnetic disc memory device according to an embodiment of the present invention.

Some embodiments of the present invention will hereinafter be described by reference to the drawings. In a first embodiment shown in FIG. 1, several magnetic discs 1 are equidistantly mounted on a cylindrical magnetic disc mounting member 3 which in turn is mounted on the upper portion of the outer peripheral surface of a cylindrical housing 5. Thus, the magnetic discs 1 are mounted on the housing 5 through the magnetic disc mounting member 3. A rotor 7 is mounted on the lower portion of the outer peripheral surface of the housing 5. The cylindrical housing 5 has a cylindrical hole 9 closed at its upper end and open at its lower end. The cylindrical hole 9 has a planar thrust bearing surface 11 at the bottom thereof and has a radial bearing surface 13 which is a cylindrical inner peripheral surface. The shaft 17 of a shaft member 15 is disposed in the cylindrical hole 9. The shaft member 15 is comprised of the cylindrical shaft 17 disposed in the cylindrical hole 9 and a shaft mounting member 19 fitted to the lower end of the shaft 17. The shaft member 15 has a convexly spherical thrust receiving surface 23 opposed to the thrust bearing surface 11 with a pressure chamber interposed therebetween, and a cylindrical radial receiving surface 27 opposed to the radial bearing surface 13 with a radial bearing gap 25 interposed therebetween. The radial receiving surface 27 is provided with a spiral dynamic pressure generating groove 35 inclined leftwardly upwardly, and a stator 37 is mounted on the shaft mounting member 19 of the shaft member. The stator 37 is opposed to the rotor 7 with a radial gap interposed therebetween, and a case 31 disposed to cover the housing 5 is mounted on the outer peripheral portion of the shaft mounting member 19 of the shaft member. The case 31 hermetically seals the housing 5, the magnetic discs 1, the rotor 7 and the stator 37 to prevent the damage and dust from the outside. The interior of the case 31 may be communicated with the atmosphere through a suitable filter to balance the pressure with the atmosphere.

In the magnetic disc memory device of the above-described construction, the housing 5 contacts the shaft member 15 from gravity when the housing 5 is stationary. When the housing 5 is rotated clockwise as viewed from above it with the rotor 7 and stator 37 as the driving mechanism, gas such as the air in the radial bearing gap 25 flows into the pressure chamber 21 due to the pumping action of the dynamic pressure generating groove 35 and the housing 5 floats up axially. The thrust bearing surface 11 rotates while being out of contact with the thrust receiving surface 23, and since the pressure of the gas in the radial bearing gap 25 is increased by the pumping action of the dynamic pressure generating groove 35, radial bearing surface 13 rotates while being out of contact with the radial receiving surface 27. In the embodiment shown in FIG. 1, the housing 5 is a rotatable member and the shaft member 15 is a stationary member, the rotatable member being supported on the stationary member through a dynamic pressure type cylindrical groove bearing.

Figure 2:
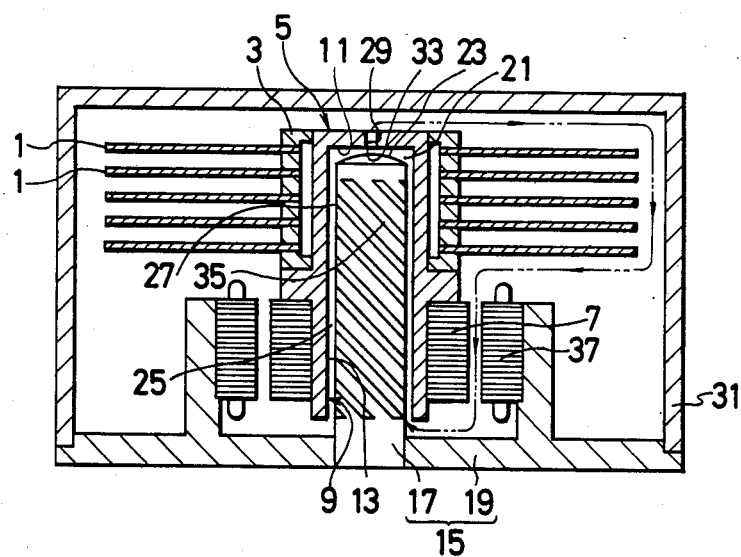
FIGS. 2 to 4 are cross-sectional views of magnetic disc memory devices according to further embodiment of the present invention.
Figure 3:
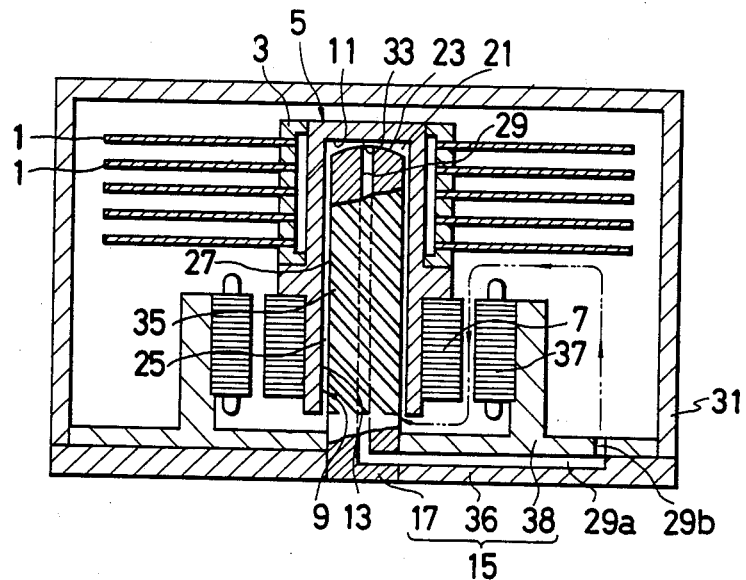
Figure 4:
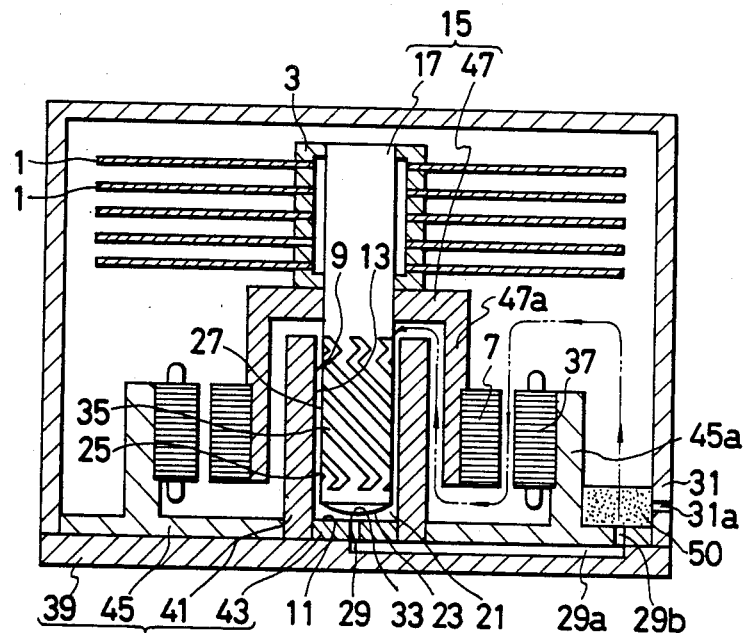

FIGS. 2, 3 and 4 show further embodiments of the present invention. With regard to these embodiments, portions thereof which differ from those of the first embodiment will hereinafter be chiefly described and portions thereof which are structurally similar to those of the first embodiment need not be described in detail.

FIG. 2 shows a second embodiment of the present invention which is a modification of the first embodiment. A communication hole 29 is axially provided in the central portion of the radial bearing surface 11 of the cylindrical housing 5, and this communication hole 29 opens into the case 31. The thrust bearing surface 11 has around the communication hole 29 an annular contact portion 33 which comes into contact with the thrust receiving surface 23 of the cylindrical housing 5 to close the communication hole 29 when the housing 5 is stationary. The case 31 completely hermetically seals the housing 5, the magnetic discs 1, the rotor 7 and the stator 37 to prevent the damage and dust from the outside. In the other points, the construction of the second embodiment is the same as that of the first embodiment.

In the above-described construction, when the housing 5 rotates, the gas in the radial bearing gap 25 flows into the pressure chamber 21 due to the pumping action of the dynamic pressure generating groove 35 and the housing 5 floats up axially. When the housing 5 floats up, the gas in the pressure chamber 21 is discharged from the communication hole 29 into the case 31 and the pressure of the gas in the pressure chamber 21 is adjusted to a substantially constant level by the variation in the amount of floating-up of the housing 5. The thrust bearing surface 11 keeps a slight amount of floating-up and rotates while being out of contact with the thrust receiving surface 23 and therefore, the amount of axial displacement of the magnetic discs 1 during the rotation of the housing 5 is small. Also, since the pressure of the gas in the radial bearing gap 25 is increased by the pumping action of the dynamic pressure generating groove 35, the radial bearing surface 13 rotates while being out of contact with the radial receiving surface 27. The gas discharged from the communication hole 29 circulates by passing the outer periphery side of the magnetic discs 1 and through the gap between the rotor 7 and the stator 37, as indicated by phantom line in FIG. 2.

Accordingly, the heat generated in the rotor 7 and the stator 37 is transmitted by the flow of the gas and therefore, various portions of the magnetic discs 1 become uniform in temperature and any positional deviation resulting from the difference in thermal expansion is not created in various portions of the magnetic discs 1 and thus, the recording density of the magnetic discs 1 can be enhanced.

FIG. 3 shows a third embodiment which is a modification of the first embodiment. The shaft member 15 is comprised of a cylindrical shaft 17 disposed in the cylindrical hole 9 of the cylindrical housing 5, a base 36 fitted to the lower end of the shaft 17, and a stator mounting member 38 mounted on the base 36. A stator 37 is mounted on the stator mounting member 38 of the shaft member 15, and a case 31 disposed over the housing 5 is mounted on the outer peripheral portion of the shaft member 15. A communication hole 29 formed through the central portion of the shaft 17 is provided in the central portion of the thrust receiving surface 23. This communication hole 29 opens into the outer peripheral portion of the stator 37 in the case 31 through a plurality of passages 29a (only one of which is shown) radially formed in the base 36 and a plurality of holes 29b (only one of which is shown) formed in the stator mounting member 38 in communication with the passages 29a. The thrust bearing surface 11 has around the communication hole 29 an annular contact portion 33 which comes into contact with the thrust receiving surface 23 to close the communication hole 29 when the housing 5 is stationary. In the other points, the construction of the third embodiment is the same as that of the first embodiment.

In the above-described construction, when the housing 5 rotates, the gas having flowed into the pressure chamber 21 due to the pumping action of the dynamic pressure generating groove 35 is discharged from the communication hole 29 into the case 31 when the housing 5 floats up. Accordingly, the housing 5 keeps a slight amount of floating-up and rotates while being out of contact with the shaft member 15, and the gas discharged from communication hole 29 circulates by passing through the gap between the rotor 7 and the stator 37 into the cylindrical hole 9, as indicated by phantom line in FIG. 3.

FIG. 4 shows a fourth embodiment of the present invention. The housing 5 is comprised of a bed 39, a sleeve 41 mounted on the bed 39 and having an upwardly open cylindrical hole 9, a support member 43 fitted to the lower portion of the inner peripheral surface of the sleeve 41, and a stator mounting member 45 fitted to the lower portion of the outer peripheral surface of the sleeve 41. The stator mounting member 45 of the housing has a cylindrical portion 45a in which a stator 37 is mounted coaxially with the sleeve 41, and the sleeve 41 has therein a planar thrust bearing surface 11 and a radial bearing surface 13 defining the cylindrical hole 9. A shaft member 15 is disposed in the cylindrical hole 9, and this shaft member 15 is comprised of a shaft 17 disposed in the cylindrical hole 9 and a rotor mounting member 47 mounted on the axially central portion of the shaft 17. The rotor mounting member 47 has a cylindrical portion 47a extending in opposed relationship with the sleeve 41 and the cylindrical portion 45a of the stator mounting member. The shaft member 15 has a convexly spherical thrust receiving surface 23 opposed to the thrust bearing surface 11 with a pressure chamber 21 interposed therebetween, and a cylindrical radial receiving surface 27 opposed to the radial bearing surface 13 with a radial bearing gap 25 interposed therebetween. A communication hole 29 is provided in the central portion of the thrust bearing surface 11. The comnunication hole 29 opens into the inner chamber of a sealing case 31 on the outer periphery side of the cylindrical stator mounting portion 45a through passages 29a (only one of which is shown) radially formed in a base 39 and a hole 29b formed in the stator mounting member 45. A filter 50 is provided on the stator mounting member 45 in the portion thereof in which the hole 29b is formed, and cleans the air circulating in the case 31 as will later be described.

The thrust bearing surface 11 has around the communication hole 29 an annular contact portion 33 which comes into contact with the thrust receiving surface 23 to close the hole 29 when the shaft member 15 is stationary. A spiral dynamic pressure generating groove 35 whose axial opposite end portions are in the form of herringbone and whose intermediate portion is leftwardly upwardly inclined is provided in the radial receiving surface 27 of the shaft 17, and a rotor 7 is mounted on the rotor mounting member 47 of the shaft member. The rotor 7 is opposed to the stator 37 with a radial gap interposed therebetween. Magnetic discs 1 are mounted on the upper portion of the shaft member 15 through a magnetic disc mounting member 3. The case 31 covering the shaft member 15 is mounted on the outer peripheral portion of the housing 5 and covers the housing 5, the magnetic discs 1, the rotor 7 and the stator 37 to prevent the damage and dust from the outside.

The case 31 may be provided with a hole 31a and the interior and exterior of the case may be communicated with each other through the filter 50 to balance the pressure in the case with the outside pressure or impart a breathing action to the air in the case.

In the magnetic disc mamory device of the above-described construction, when the shaft member 15 is rotated clockwise as viewed from above it with the rotor 7 and the stator 37 as the driving mechanism, gas such as the air in the radial bearing gap 25 flows into the pressure chamber 21 due to the pumping action of the dynamic pressure generating groove 35 and the shaft member 15 floats up axially. When the shaft member 15 floats up, the gas in the pressure chamber 21 is discharged from the communication hole 29 into the case 31 and the pressure of the gas in the pressure chamber 21 is adjusted to a substantially constant level by the variation in the amount of floating-up of the shaft member 15. The thrust receiving surface 23 keeps a slight amount of floating-up and rotates while being out of contact with the thrust bearing surface 11, and since the pressure of the gas in the radial bearing gap 25 is increased by the pumping action of the dynamic pressure generating groove 35, the radial receiving surface 27 rotates while being out of contact with the radial bearing surface 13. Since the axial opposite end portions of the dynamic pressure generating groove 35 are in the form of herringbone, the pressure of the gas at the axial opposite end portions of the radial bearing gap 25 becomes higher and vibration of the shaft member 15 is small. The gas discharged from the communication hole 29 circulates by passing through the gap between the rotor 7 and the stator 37 into the cylindrical hole 9 is indicated by phantom line in FIG. 4. In the embodiment of FIG. 4, the shaft member 15 is a rotatable member and the housing 5 is a stationary member, and the rotatable member is supported on the stationary member through a dynamic pressure type cylindrical groove bearing. The stator may be mounted on the outer peripheral surface of the sleeve 41 so that this stator may be opposed to the rotor mounted on the inner peripheral surface of the rotor mounting member 47.

In the embodiments illustrated, the dynamic pressure generating groove 35 is provided in the radial receiving surface 27, but alternatively, such dynamic pressure generating groove 35 may be provided in both of the radial receiving surface 27 and the radial bearing surface 13 of only in the radial bearing surface 13.

Also, both of the thrust bearing surface 11 and the thrust receiving surface 23 may have the communication hole 29 open into the case 31.

Further, the thrust bearing surface 11 and the thrust receiving surface 23 may be convex, concave or planar.

Also, the motor may be a plane opposed type motor in which the rotor 7 and the stator 37 are opposed to each other with an axial gap interposed therebetween.

According to the magnetic disc memory device of the present invention, the rotatable member rotates while being out of contact with the stationary member and therefore, the rotatable member hardly vibrates and the magnetic discs 1 mounted on the rotatable member do not vibrate and thus, the recording density can be enhanced by narrowing the intervals between the adjacent annularly recorded portions of the magnetic discs 1. Also, since the recording density of the magnetic discs 1 can be enhanced, the magnetic discs 1 can be made compact and light in weight. Further, the dynamic pressure type cylindrical groove bearing does not use oil or grease as lubricant and the rotatable member is supported on the stationary member through gas such as air during the rotation thereof the therefore, the magnetic discs 1 and a magnetic head, not shown, which is opposed to the magnetic discs 1 are not contaminated and thus, it will never happen that reading and writing of the magnetic discs 1 becomes impossible or the magnetic head is damaged. Further, there is no necessity of using the contact type seal, the non-contact type seal or the magnetic fluid seal used in the conventional ball bearings, and this leads to a low cost. Furthermore, the dynamic pressure type cylindrical groove bearing is smaller in friction moment than the ball bearing and therefore, the power of the motor may be smaller, and this leads to the possibility of making the motor compact. Also, the rotatable member rotates while being out of contact with the stationary member, and this leads to an excellent effect that the dynamic pressure type cylindrical groove bearing does not generate heat and the temperature rise of the gas in the case 31 is low, which effect could not be obtained in the magnetic disc memory devices according to the prior art.

I claim:
1. A magnetic disc memory device comprising:
a rotatable member;
a stationary member for supporting said rotatable member, one of said rotatable member and said stationary member being a housing and the other being a shaft member;
a cylindrical hole (9) provided in said housing (5) having a thrust bearing surface (11) and a cylindrical radial bearing surface (13), said shaft member (15) disposed in said cylindrical hole (9) having a thrust receiving surface (23) opposed to said thrust bearing surface (11) and a radial receiving surface (27);
an axial pressure chamber being formed between said thrust surfaces;

at least one of said radial bearing surface (13) and said radial receiving surface (27) is provided with a dynamic pressure generating groove (35) to produce gas pressure upon relative rotation;

information recording magnetic disc means mounted on the outer peripheral portion of said rotatable member;

an annual rotor provided on the outer portion of said rotatable member in axially spaced relationship with said magnetic disc means;

a stator secured to said stationary member and facing said annular rotor;

said stator and said rotor together constituting an electric motor; and a closed case secured to said stationary member and enclosing said magnetic disc means, said rotatable member, said rotor and said stator to seal them from extraneous dusts or contaminants; and a communication hole (29) connecting said axial pressure chamber to the interior of said closed case;

wherein the gas is pressurized in cylindrical hole (9) by the relative rotation of said radial receiving surface (11) and said cylindrical radial bearing surface (13) to provide radial support of said rotor, the gas flowing to said axial pressure chamber to provide axial support to said rotor; the gas then flowing from said axial pressure chamber through said communicaiton hole (29) to the internal portion of the case and then flowing between said rotor and said stator and then returning to said cylindrical hole (9).

2. The magnetic disc memory device according to claim 1 wherein at least one of said thrust bearing surface (11) and said thrust receiving surface (23) has a communication hole (29) opening into said case (31), and said thrust bearing surface (11) has around said communication hole (29) an annular contact portion (33) adapted to come into contact with said thrust receiving surface (23) when said rotatable member is stationary.

3. The magnetic disc memory device according to claim 2 wherein gas discharged from said communication hole (29) during the rotation of said rotatable member flows through the gap between said rotor (7) and said stator (37) into said cylindrical hole (9).

4. The magnetic disc memory device according to claim 1, wherein said dynamic pressure generating groove (35) is a spiral groove.

5. The magnetic disc memory device according to claim 1, wherein said dynamic pressure generating groove (35) is herringbone-like grooves provided at the axial opposite end portions of the radial receiving surface (27).

6. The magnetic disc memory device according to claim 1, wherein said rotatable member is the housing (5).

7. The magnetic disc memory device according to claim 1, wherein said rotatable member is the shaft member (15).

8. The magnetic disc memory device according to claim 1, wherein said magnetic disc means includes a plurality of magnetic discs spaced axially from each other.

9. The magnetic disc memory device according to claim 1, wherein said rotor and stator radially face each other.

10. The magnetic memory device according to claim 1, wherein said case is formed with passage means (31a) through which air within the case is communicated with the outside of the case, and filter means (50) is provided at the passage means (31a) to prevent foreign contaminants from flowing into the case.

* * * * *